June 14, 1949. A. J. MORRIS 2,473,254
PISTON WITH ANNULAR HEAT DAM IN THE HEAD
Filed Jan. 5, 1946
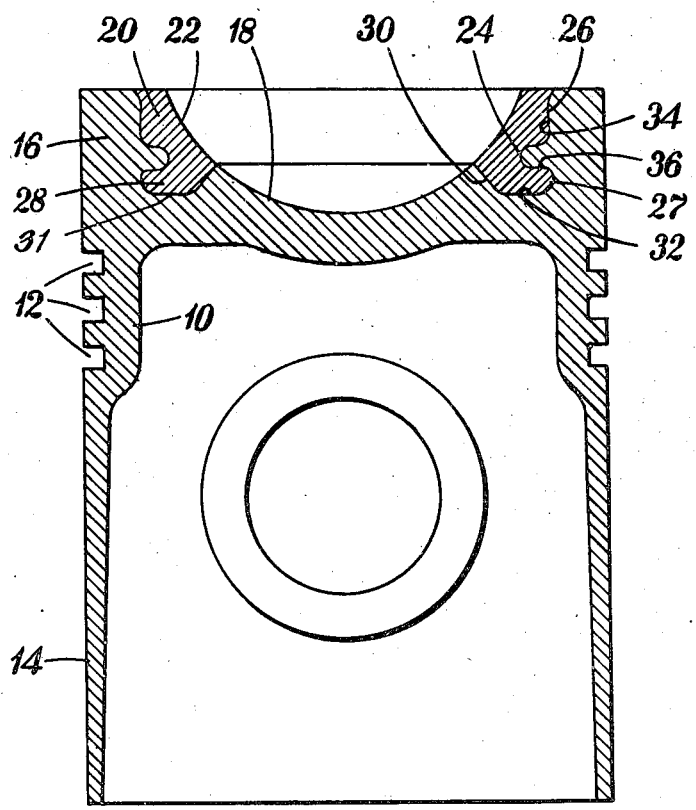
Alberto J. Morris
Inventor
by his attorneys
Stebbins, Blenko & Webb Patented June 14, 1949

2,473,254

UNITED STATES PATENT OFFICE 2,473,254

PISTON WITH ANNULAR HEAT DAM IN THE HEAD

Alberto Jorge Morris, Dursley, England, assignor to R. A. Lister & Company Limited, Dursley, England, a British company Application January 5, 1946, Serial No. 639,234
In Great Britain February 8, 1945

2 Claims. (Cl. 309—9)

This invention relates to pistons, and is particularly applicable to the pistons of internal-combustion engines, such as Diesel and semi-Diesel engines, although it is not restricted thereto.

It is an object of the present invention to increase the temperature of a region of the piston bounding the combustion or other working space in the cylinder above that of the remainder of the body of the piston, for the purpose of increasing the efficiency of the engine provided with the piston.

According to the invention there is provided a piston, whereof the body has at its crown end an end part, between which and the body the thermal resistance to heat-flow is greater than that of the body itself, characterised in that the said end part is secured in position by a casting operation.

The piston may comprise an insert composed of a material, whereof the thermal conductivity is the same as or different from that of the body of the piston.

Conveniently the body of the piston is cast around the said end part or insert, which may be keyed in position in the body of the piston.

Preferably, when a recess receives the insert, the recess has an annular undercut portion, by which the insert is keyed in position.

One embodiment of the invention is diagrammatically illustrated by way of example in the accompanying drawing, wherein one construction of piston according to the invention is shown in vertical sectional elevation.

Referring to the drawing, the piston illustrated is of a type used in internal-combustion engines, and comprises, as usual, a body portion 10 that has annular grooves 12 for piston-rings and a skirt 14 extending axially below them, the head or crown 16 of which piston has a central part-spherical recess 18. According to the present invention a metallic insert 20 is placed at the bottom of a piston mould, and the piston metal is then poured in the usual way. The metallic insert is an annular member having a concave part-spherical, inner peripheral face 22, and an annular groove 24 divides its outer peripheral face into two parts 26, 27, so that the insert has an external rib 28 at that end which lies furthest within the piston. An inner part 30 of the inner peripheral face of the insert that is concentric with the rib 28 is of conical formation, and the part 26 of the outer peripheral face of the insert concentric with the part-spherical face is slightly concave.

When the body 10 is cast around the insert 20 it has formed in it the central part-spherical recess 18, and an annular groove 31 is formed in the side portion of the recess, which groove comprises two parts 32, 34 having an annular ribb 36 between them so that the groove is undercut and has one inner part 32 in the form of an annular channel forming the undercut portion. In the finished piston the rib 28 of the insert lies in the said annular channel 32 in the body, and the rib 36 of the head 16 of the piston lies in the external annular groove 24 in the insert 20.

The insert 20 attains a higher temperature than the piston-body 10 during running, because the heat conductivity to the metal of the piston-body is reduced by the discontinuity of metal, there being a very small gap between the insert and the piston-body. This gap is hardly visible to the naked eye and has the nature of a crack.

Owing to the high temperature of the insert, during operation, when the piston is used in a Diesel engine it promotes the combustion of the fuel.

The coefficient of expansion of the material selected for the insert 20, as well as its shape and heat-resisting qualities, will be such that the insert remains firmly fixed in position in the piston under long and severe conditions of working. The specific heat conductitvity of the insert may be very high; this is an advantage, as it promotes evenness of temperature, and burning of sharp corners and other parts will be prevented.

Examples of suitable metals for use as such an insert 20 or facing are: Mild steels, stainless steels, stainless irons, austenitic irons and steels, and silicon chrome steels, but other metals, and other materials, such as ceramics, may be used. These examples are suitable for the insert in the crowns of pistons which are made from aluminium alloy, cast iron, malleable iron, steel or the product of any convenient powder metallurgy process.

When using ferrous metal for the piston, and an insert not made of stainless steel, it is preferable to coat the insert with tin, so as to prevent rust, and resulting "gasing" of the piston metal during casting.

The invention provides a cheap method of manufacturing a piston adapted for use in Diesel and semi-Diesel engines, and provides a more efficient construction of piston from the thermal and mechanical point of view than other methods proposed heretofore. A further advantage accruing from the invention is that if the insert is composed of heat-resisting steel it would prevent the oxidation of the piston crown, and with excessive temperatures might even save the piston body with a lower fusing point from melting.

Various modifications may be made in the details of construction described above without departing from the invention. For example, the described insert may be so large that it extends substantially completely over the end face of the head of the piston and thus forms a facing thereof.

I claim:

1. A piston for an engine of the Diesel type comprising a cylindrical metal body, an imperforate head at one end of and in one piece with the body, said head having a central concavity in the shape of a spherical segment and an annular insert of a high heat conductivity material embedded in the head with its surface exposed so as to border the central concavity, the said insert having an outside diameter less than that of the body and having part of its exposed surface formed as a continuation of the spherical concavity, and said insert having a groove and a rib on its outer periphery interlocking with the material of the head.

2. A piston for an engine of the Diesel type comprising a cylindrical metal body, an imperforate head at one end of and in one piece with the body, said head having a central concavity, and an insert of a high heat conductivity metal embedded in the head with part of its surface exposed so as to border the central concavity, said insert having an outside diameter less than the diameter of the body, and having its exposed surface formed as a continuation of the central concavity, and said insert having on its outer periphery a groove and rib to interlock with the material of the head and having a selected coefficient of thermal expansion such that the insert is retained firmly in position under all working conditions.

ALBERTO JORGE MORRIS.

REFERENCES CITED

The following references are of record in the file of this patent:

UNITED STATES PATENTS

| Number | Name | Date |
|---|---|---|
| 1,270,374 | Buchanan | June 25, 1918 |
| 1,405,887 | Alt | Feb. 7, 1922 |
| 1,462,034 | Corser | July 17, 1923 |
| 1,462,655 | Philip | July 24, 1923 |
| 1,946,081 | Koch | Feb. 6, 1934 |
| 2,336,918 | Aske | Dec. 14, 1943 |

FOREIGN PATENTS

| Number | Country | Date |
|---|---|---|
| 298,033 | Germany | Sept. 10, 1919 |